United States Patent
Akalin et al.

(10) Patent No.: US 8,621,091 B1
(45) Date of Patent: Dec. 31, 2013

(54) SYSTEM AND METHOD FOR SYNCHRONIZING SETTINGS AND STATE INFORMATION FOR A BROWSER COMPONENT

(75) Inventors: Frederick Ziya Ramos Akalin, Seattle, WA (US); Benjamin Thomas Kalman, Chatswood (AU)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/360,606

(22) Filed: Jan. 27, 2012

Related U.S. Application Data

(60) Provisional application No. 61/576,216, filed on Dec. 15, 2011.

(51) Int. Cl.
 *G06F 15/177* (2006.01)
(52) U.S. Cl.
 USPC ............ 709/228; 709/227; 709/221; 709/220
(58) Field of Classification Search
 USPC .................................. 709/227, 228, 220–222
 See application file for complete search history.

(56) References Cited

U.S. PATENT DOCUMENTS

| | | | | |
|---|---|---|---|---|
| 6,199,099 B1* | 3/2001 | Gershman et al. | ............ | 709/203 |
| 6,970,904 B1* | 11/2005 | Rode | .............................. | 709/203 |
| 7,899,915 B2* | 3/2011 | Reisman | ........................ | 709/228 |
| 7,925,694 B2* | 4/2011 | Harris | ............................ | 709/203 |
| 7,987,491 B2* | 7/2011 | Reisman | ........................ | 725/112 |
| 8,161,172 B2* | 4/2012 | Reisman | ........................ | 709/228 |
| 2002/0007409 A1* | 1/2002 | Rode | .............................. | 709/203 |
| 2003/0229900 A1* | 12/2003 | Reisman | .......................... | 725/87 |
| 2004/0049673 A1* | 3/2004 | Song et al. | ..................... | 713/150 |
| 2006/0168645 A1* | 7/2006 | Song et al. | .......................... | 726/3 |
| 2006/0174327 A1* | 8/2006 | Song et al. | .......................... | 726/3 |
| 2007/0157304 A1* | 7/2007 | Logan et al. | ...................... | 726/12 |
| 2007/0180125 A1* | 8/2007 | Knowles et al. | ............... | 709/227 |
| 2007/0208862 A1* | 9/2007 | Fox et al. | ....................... | 709/227 |
| 2009/0320073 A1* | 12/2009 | Reisman | .......................... | 725/51 |
| 2011/0296038 A1* | 12/2011 | Mandre | .......................... | 709/228 |

\* cited by examiner

*Primary Examiner* — Kenneth Coulter
(74) *Attorney, Agent, or Firm* — McDermott Will & Emery LLP

(57) ABSTRACT

A system and method is disclosed for synchronizing settings and state information for a browser component across multiple computing environments. Settings and state information may be stored for a web application in a storage associated with a user account. An API receives updated state information for the browser component from a first web browser associated with the user account and sends a signal to a second web browser associated with the user account that the stored settings and state information was updated. The second web browser may then send a request to the API for the updated information, the API, in response, propagate the updated information to the second web browser.

22 Claims, 4 Drawing Sheets

SYSTEM AND METHOD FOR SYNCHRONIZING SETTINGS AND STATE INFORMATION FOR A BROWSER COMPONENT

CROSS-REFERENCES TO RELATED APPLICATIONS

This application claims priority from U.S. Provisional Application No. 61/576,216, filed Dec. 15, 2011, which is incorporated herein by reference in its entirety.

TECHNICAL FIELD

The subject technology relates generally to the synchronization of computer-related applications.

BACKGROUND

Web applications (for example, games, email services, or the like), when accessed or executed by a web browser, may store certain information on the device hosting the web browser. The information may include user-specific settings and state information regarding the web application in the form of a cookie or, where applicable, a set of data stored in a local file system. If a user closes the web browser and then uses web application on another web browser, for example, on a different device, then the settings and state for the web application will be lost and the user will be forced to start the web application from a default state.

SUMMARY

The subject technology provides a system and computer-implemented method for synchronizing settings and state information for a browser component across multiple computing environments. According to one aspect, the computer-implemented method may include storing state information for a browser component in a storage associated with a user account, receiving updated state information from a first instance of the browser component operating in connection with a web browser and the user account, and propagating the updated state information to a second instance of the browser component, upon an initiation of the second instance of the browser component and subsequent to an initiation of the first instance of the browser component.

In another aspect, a system may include a process and a memory, the memory having server instructions that, when executed, cause the processor to store state information for a browser component in a storage remote from a client device, the storage associated with a user account, receive updated state information from a first instance of the browser component operating on the first device and in connection with the user account, and send the updated state information to a second instance of the browser component operating on a second device, upon an initiation of the second instance of the browser component and subsequent to an initiation of the first instance of the browser component.

In a further aspect, a machine-readable medium may include instructions that, when executed, perform a method that includes storing state information for a browser component in a storage associated with a user account, receiving updated state information from a first instance of the browser component operating in connection with a web browser and the user account, confirming that the second instance of the browsing component is operating in connection with a browsing session authenticated to the user account, and propagating the updated state information to a subsequent instance of the browser component, upon an initiation of the subsequent instance of the browser component.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

Figure 1:
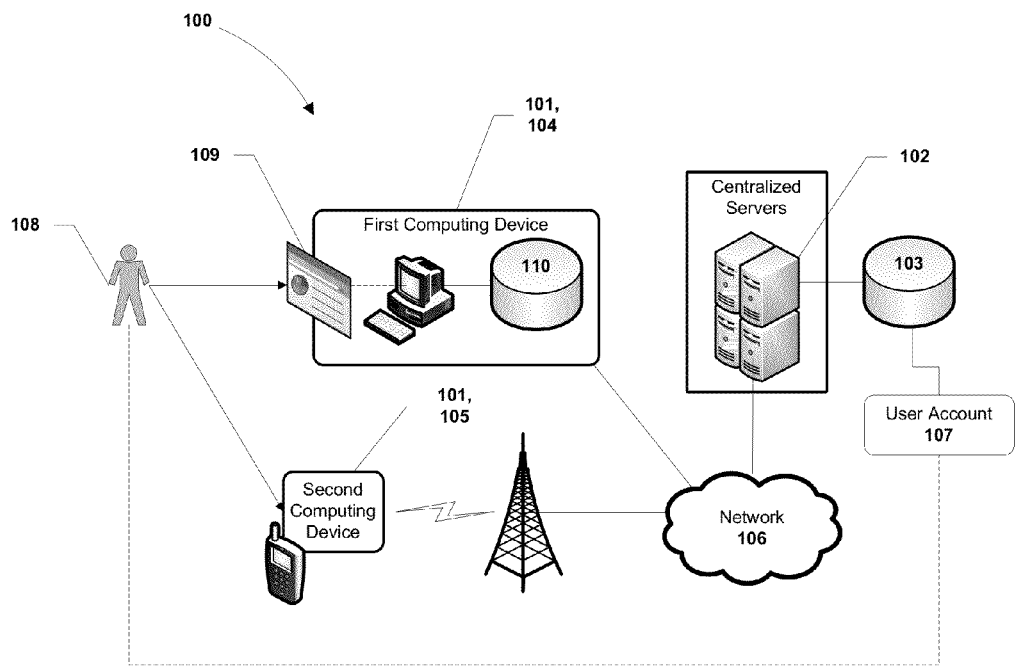
FIG. 1 is a diagram of a system for synchronizing settings and state information related to a browser component across multiple computing devices according to one aspect of the subject technology.

FIG. 1 is a diagram of a system 100 for synchronizing settings and state information related to a browser component across multiple computing devices according to one aspect of the subject technology. System 100 may include one or more computing devices 101 (for example, a smart phone, tablet or notebook computer, personal computer, PDA, or the like), one or more centralized servers 102, and a remote storage 103 (for example, a database). Centralized servers 102 may be operably connected to, for example, a first computing device 104 and a second computing device 105, and remote storage 103, over a network 106 (for example, a LAN, WAN, WiFi, cellular network, or the Internet). Remote storage 103 may be configured to store information in connection with a user account 107. User account 107 may be, for example, a web-based user account (for example, an email account) or may be an enterprise account (for example, LDAP account). Centralized servers 102 may be configured to provide one or more websites and/or browser components, for display to one or more computing devices 101, including an authentication screen for the authentication of a user 108 to user account 107.

A computing device 101 may be configured to load and execute a web browser 109 for the display of one or more browser components (for example, one or more browser components 203 of FIG. 2) provided by centralized server 102. A browser component may include, for example, software extensions, plugins, add-ons, themes, web browser applications, and the like. A browser component may be a hosted application, including data (for example, a webpage) for display of a website supplemented with corresponding metadata (for example, a name or other identifier, launch instructions, web address, or the like), or a packaged application, including downloadable software integratable with a web browser for use online or offline.

In one aspect, computing device 101 may be configured to store data related to a browser component in a local storage 110 (for example, a local database, data directory, file system, a memory-resident data object, or the like) associated with computing device 101. As will be described in further detail, data stored in local storage 110 may include configuration data, component data and settings, state information, cookies, and the like. For example, data stored in local storage 110 may include configuration information, including user-specific settings, for one or more browser components, and/or state information for the one or more browser components (for example, in the form of currently entered text or numeric fields, variable values, screen or tab settings, and the like). The configuration and state information may be stored such that they may be retrieved by a computing device 101, and used to execute, install, update, or recover the one or more browser components in accordance with the stored information. In this manner, data for a first instance of a browser component may be stored in local storage 110 and, if the browser is closed and reopened, or a different browser reopened to display a second instance of the browser component, the second instance of the browser component may execute as if the user never closed the first instance. Moreover, if the first instance of the browser component (or, for example, web browser 109) becomes uninstalled or corrupted, a second instance of the browser component may be executed or re-installed using the stored data to duplicate the settings and state of the first instance without user intervention.

Data storage 110 may include a local storage object that enables a browser component to store information (for example, as named key/value pairs) locally within the object. The local storage object may be a memory-resident data object associated with web browser 109. In one aspect, the local storage object may be based on a version of the HTML5 storage specification, and may be implemented natively in web browser 109. In this regard, the local storage object may persist in memory like a cookie, and information stored in the local storage object may persist even after user 108 navigates away from a current website associated with the browser component or closes web browser 109. A browser component may store settings and state information in the local storage object while the web component is used by web browser 109. In one aspect, the local storage object, or the information therein, may be automatically transmitted to centralized server 102 for storage at remote storage 103. In another aspect, local storage object, or the information therein, may only be transmitted if web browser 109 has been authenticated to user account 107, or if manually authorized or initiated by user 108.

The data stored in local storage 110 (for example, the local storage object) may be organized and/or indexed by a data type. A data type may include a designation for one or more elements of user data (for example, profile data, user-specific settings, state information corresponding to a user session, or the like) associated with a browser component, or a user-interaction involving the browser component. A data type may also include, for example, a designation for a specific browser component used by user 108, and/or a designation for a corresponding set of stored elements for use with that component. In this regard, a browser component may be indexed by its designation to retrieve the browser component's associated data elements from local storage 110 to facilitate an installation, update, or recovery of a browser component, including the component's user-specific settings and/or state information.

Computing device 101 may be configured to connect to centralized server 102 and to provide the data stored in local storage 110 to centralized server 102 for synchronization with data stored at remote storage 103. In one aspect, a first computing device 104 may send the locally stored data to centralized server 102, and centralized server 102 may receive and store the data in remote storage 103 so that it may be accessed and synchronized with a second computing device 105, even when the first device is offline. Centralized server 102 may also store synchronization information for one or more computing devices 101, including the last time each device was synchronized, the data types synchronized, and the like.

The previously described synchronization process may be used between different types of computing devices 101 or related software applications. For example, various browser components may be installed on a web browser 109 of a smart phone. As long as those browser components are associated with user account 107, data corresponding to the browser components may be uploaded and stored on remote storage 103 for synchronization with other devices running a web browser 109, such as a personal computer. Stand-alone applications associated with a user account 107 may also be synchronized. A synchronization component may be installed in connection with an operating system to monitor and synchronize data stored at local storage 110 for a stand-alone application with data stored at remote storage 103. In this manner, a browser component may be installed or updated on a personal computer with data corresponding to a stand-alone application used on a smart phone.

The various connections between computing devices 101, centralized server 102, and remote storage 103 may be made over a wired or wireless connection. In some aspects, the functionality of centralized server 102 and remote storage 103 may be implemented on the same physical server or distributed among a plurality of servers. Moreover, remote storage 103 (and/or local storage 110) may take any form such as relational databases, object-oriented databases, file structures, text-based records, or other forms of data repositories.

Figure 2:
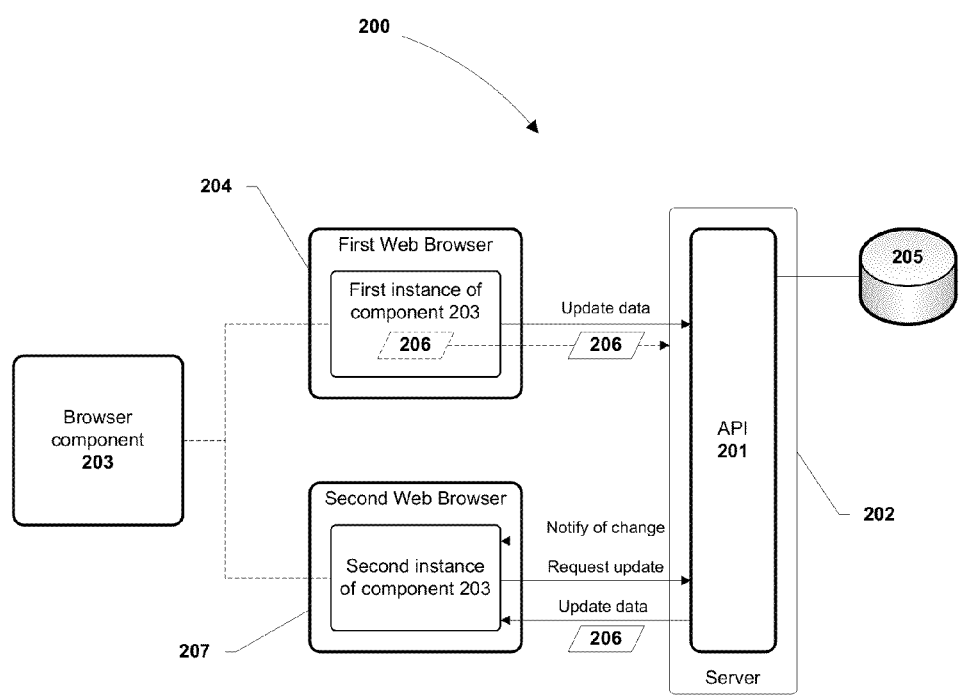
FIG. 2 is a diagram of a computer-enabled system, including an application programming interface, for synchronizing settings and state information related to a browser component across multiple computing environments according to one aspect of the subject technology.

FIG. 2 is a diagram of a computer-enabled system 200, including an application programming interface, for synchronizing settings and state information related to a browser component across multiple computing environments according to one aspect of the subject technology. System 200 may include one or more application programming interfaces (APIs) for facilitating communication between one or more web browser components, each operating at a different computing device, and a remote synchronization server. In one aspect, an API 201 may be located on a remote server 202 (for example, centralized server 102) and provided to a browser component 203 operating in connection with a web browser (for example, running or executing within web browser 109). Using API 201, browser component 203 may persist browser component information, including settings and state, to a centralized storage 205 for synchronization with a browser component 203 operating in connection with other web browsers. In another aspect, API 201 may be provided for communication between remote server 202 and a local extension settings API. The local extension settings API may be provided, for example, to facilitate communication between browser component 203 and a local storage (for example, local storage 110) and API 201. In this regard, the examples herein regarding communication or function calls between API 201 and browser component 203 may be considered, in some aspects, to include communication between browser component 203 and the local extension settings API.

Browser component 203 may store application-specific information, such as configuration and state information, in a local storage object 206 associated with a first web browser 204 and then minor that information on centralized storage 205 for backup protection and/or synchronization with other instances of browser component 203. As depicted in FIG. 2, API 201 may be configured to receive a callback function from browser component 203, including local storage object 206 as an argument. To synchronize the locally stored information, browser component 203 may pass the callback function, including a local storage object 206 (for example, from local storage 110), to API 201 (for example, via the previously described local extension settings API). When information is stored or updated by browser component 203 in local storage object 206, it may then be automatically mirrored, stored or updated at centralized storage 205. Similarly, once information has been stored or updated in centralized storage 205, API 201 may propagate the changes to a different instance of browser component 203 operating, for example, in a different web browser instance (for example, a second web browser 207) using the callback function of that instance of browser component 203.

In another aspect, synchronization of information may be turned on or off depending on how a browser component (or its developer) chooses to manage information that has changed at centralized storage 205. A browser component 203 (for example, operating in second web browser 207) may, for example, register an event listener with API 201 (for example, via the local extension settings API). The event listener may listen for change events (for example, that data has been updated) broadcast by API 201. In one aspect, the event listener may be a form of callback function, registered at API 201 by an instance of browser component 203 (or the local extension settings API), the callback function being executed by API 201 on certain events (for example, on receiving an indication that data has been updated at centralized storage 205). In one example, a first web browser 204 and a second web browser 207 may be operably connected to API 201 (for example, having registered respective event listeners). A browser component 203 displayed by first web browser 204 may update data stored at centralized storage 205 by calling a function of API 201 with, for example, a name of a setting and a corresponding value as function arguments.

An information monitoring service, running concurrently with API 201 on server 202, may monitor information stored at centralized storage 205. On an update of browser component information, centralized server 202 may broadcast a signal to all registered browser components (including browser component 207) currently running in a web browser, notifying them that the stored information was updated, by calling their registered event listeners. In one aspect, a browser component 203 running in the second web browser 207 may receive at an event listener an indication (for example, a signal, notification, or the like) that information stored in local storage object 206 has been updated at, for example, centralized storage 205. In some aspects, the indication may include the name of the changed value and/or the value. Browser component 203 may then (immediately) update the locally stored information. In other aspects, on receiving the indication, web browser 206 may call API 201 to inquire which data fields were updated since a last update time and then pass the previously described callback function, including local storage object 205, to centralized server 202 to receive an update of the locally stored information.

In another aspect, browser component 203 may periodically call API 201 to update the stored data, or check for updates. Alternatively, browser component 203 may wait until a restart of web browser 206 before performing an update. Browser component 203 may also delay calling API 201 until a time convenient for it (for example, after running other processes). In this regard, API 201 enables a browser component developer to have control on how often synchronization occurs. Browser component developers may also designate one or more data types to be synchronized by setting a flag (for example, at a predefined local storage object 206) for each data type to be synchronized for a browser component 203. Moreover, synchronization information (for example, data fields, values, and the like) may be stored (for example, at API 201, in centralized storage 205 or local storage object 206, or the like) for each data type at remote storage 103, for use by centralized server 102 and synchronized devices 101 to determine when a synchronization last occurred, what data was synchronized, and the like.

As described previously, access to API 201 may be based on authentication or association to a user account. In this regard, the synchronization of information stored at centralized storage 205 may be made available only to browser components 203 that are in use by an authenticated web browser, or an unauthorized web browser that can be verifiably associated with the user account. For example, on a user authentication to a user account, first web browser 204 or second web browser 207 may initiate a browser session and store authentication information (for example, an authentication token) in connection with the session (for example, as a cookie on the web browser or at the remote web server using a session identifier). In another aspect, centralized server 202 may monitor synchronization bandwidth for each registered browser component 203 and throttle the bandwidth down (or up) if the number of changes made over a predetermined period exceeds a predetermined threshold (for example, hundreds or thousands of changes in a 24 hour period).

Figure 3:
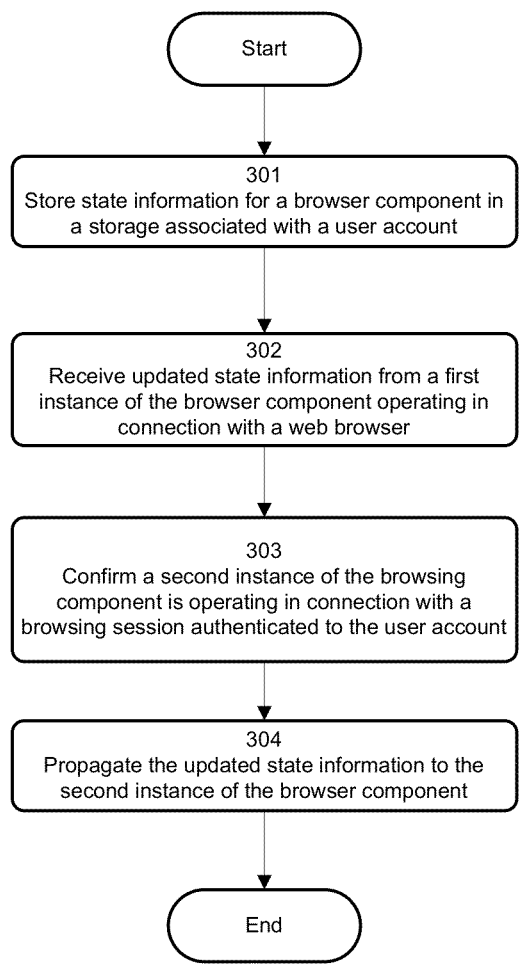
FIG. 3 is a flowchart illustrating a process for synchronizing settings and state information related to a browser component across multiple computing environments according to one aspect of the subject technology.

FIG. 3 is a flowchart illustrating a process for synchronizing settings and state information related to a browser component across multiple computing environments according to one aspect of the subject technology. According to some aspects, the process may be implemented by computing devices operably connected over a network. In another aspect, the process may be implemented instructions stored on a machine-readable medium (for example, stored on ROM 403, system memory 405, or storage medium 407 of FIG. 4) and executed by one or more computing devices (for example, computing devices 101, centralized server 102, remote server 202, or the like).

At 301, state information is stored for a browser component in a storage associated with a user account (for example, remote storage 103 or centralized storage 205). At 302, updated state information is received from a first instance of the browser component operating in connection with a web browser. The web browser may be associated with the user account, for example, a browsing session may be authenticated to the user account and the first instance of the browser component may be operating in connection with the browsing session. At 303, a second instance of the browsing component is confirmed to be operating in connection with a browsing session authenticated to the user account.

At 304, the updated state information is propagated to the second instance of the browser component. The updated state information may be propagated, for example, upon an initiation of the second instance of the browser component. In this regard, the updated state information may begin propagating on the initiation of the second instance and continue to propagate as new information is received from the first instance after the initiation of the second instance, or otherwise made available at the storage after the initiation of the second instance. The second instance of the browser component may be operating in connection with another browser, for example, on a different computing device. In other aspects, the second instance of the browser component may be operating in connection with the same web browser, for example, after a restart of the web browser.

In other aspects, a signal may be sent to the second instance of the browser component that the stored state information was updated, and, in response to the signal, the second instance of the browser component may send a request for updated state information. In this regard, the request may be received before the updated state information is propagated to the second instance of the browser component. Additionally, the state information stored, updated, and/or propagated may include settings related to the browser component (for example, configuration information). The process may also monitor a bandwidth related to the storing or propagating of the updated state information, and throttle down bandwidth availability on a determination that a number of changes to the state information made over a predetermined period exceeds a predetermined threshold.

Figure 4:
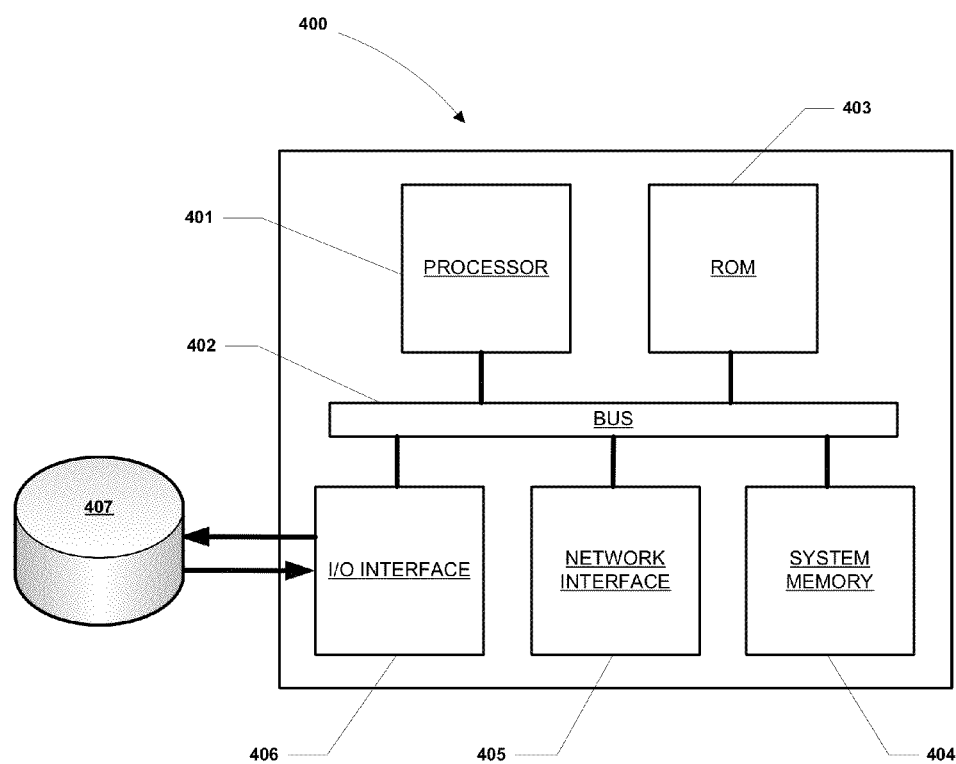
FIG. 4 is a diagram illustrating a machine or computer for synchronizing settings and state information related to a browser component, including a processor and other internal components, according to one aspect of the subject technology.

FIG. 4 is a diagram illustrating a machine or computer for synchronizing settings and state information related to a browser component, including a processor and other internal components, according to one aspect of the subject technology. In some aspects, a computerized device 400 (for example, computing devices 101, centralized server 102, remote server 202, or the like) includes several internal components such as a processor 401, a system bus 402, read-only memory 403, system memory 404, network interface 405, I/O interface 406, and the like. In one aspect, processor 401 may also be in communication with a storage medium 407 (for example, a hard drive, database, or data cloud) via I/O interface 406. In some aspects, all of these elements of device 400 may be integrated into a single device. In other aspects, these elements may be configured as separate components.

Processor 401 may be configured to execute code or instructions to perform the operations and functionality described herein, manage request flow and address mappings, and to perform calculations and generate commands. Processor 401 is configured to monitor and control the operation of the components in server 400. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a ROM within processor 401. Likewise, one or more sequences of instructions may be software stored and read from system memory 405, ROM 403, or received from a storage medium 407 (for example, via I/O interface 406). ROM 403, system memory 405, and storage medium 407 represent examples of machine or computer readable media on which instructions/code may be executable by processor 401. Machine or computer readable media may generally refer to any medium or media used to provide instructions to processor 401, including both volatile media, such as dynamic memory used for system memory 404 or for buffers within processor 401, and non-volatile media, such as electronic media, optical media, and magnetic media.

In some aspects, processor 401 is configured to communicate with one or more external devices (for example, via I/O interface 406). Processor 401 is further configured to read data stored in system memory 404 and/or storage medium 407 and to transfer the read data to the one or more external devices in response to a request from the one or more external devices. The read data may include one or more web pages and/or other software presentation to be rendered on the one or more external devices. The one or more external devices may include a computing system such as a personal computer, a server, a workstation, a laptop computer, PDA, smart phone, and the like.

In some aspects, system memory 404 represents volatile memory used to temporarily store data and information used to manage device 400. According to one aspect of the subject technology, system memory 404 is random access memory (RAM) such as double data rate (DDR) RAM. Other types of RAM also may be used to implement system memory 404. Memory 404 may be implemented using a single RAM module or multiple RAM modules. While system memory 404 is depicted as being part of device 400, those skilled in the art will recognize that system memory 404 may be separate from device 400 without departing from the scope of the subject technology. Alternatively, system memory 404 may be a non-volatile memory such as a magnetic disk, flash memory, peripheral SSD, and the like.

I/O interface 406 may be configured to be coupled to one or more external devices, to receive data from the one or more external devices and to send data to the one or more external devices. I/O interface 406 may include both electrical and physical connections for operably coupling I/O interface 406 to processor 401, for example, via the bus 402. I/O interface 406 is configured to communicate data, addresses, and control signals between the internal components attached to bus 402 (for example, processor 401) and one or more external devices (for example, a hard drive). I/O interface 406 may be configured to implement a standard interface, such as Serial-Attached SCSI (SAS), Fiber Channel interface, PCI Express (PCIe), SATA, USB, and the like. I/O interface 406 may be configured to implement only one interface. Alternatively, I/O interface 406 may be configured to implement multiple interfaces, which are individually selectable using a configuration parameter selected by a user or programmed at the time of assembly. I/O interface 406 may include one or more buffers for buffering transmissions between one or more external devices and bus 402 and/or the internal devices operably attached thereto.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The term website, as used herein, may include any aspect of a website, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method for synchronizing information related to a browser component across multiple computing environments, the method comprising:
    storing state information for a browser component in a remote storage associated with a user account;
    receiving updated state information from a first instance of the browser component operating in connection with a web browser and the user account;
    notifying the second instance that the stored state information was updated;
    receiving a request from the second instance of the browser component for the updated state information; and
    propagating, from the remote storage, the updated state information to the second instance of the browser component, the first instance and the second instance operating during one or more overlapping periods, the updated state information being propagated subsequent to an initiation of the first instance, and at periodic time intervals during the one or more overlapping periods.

2. The computer-implemented method of claim 1, wherein the request from the second instance of the browser component is received periodically.

3. The computer-implemented method of claim 1, wherein the request from the second instance of the browser component is received on the initiation of the second instance of the browser component.

4. The computer-implemented method of claim 1, wherein the step of propagating includes propagating state information made available at the storage after the initiation of the second instance.

5. The computer-implemented method of claim 1, further comprising:
    propagating state information received from the second instance of the browser component to a third instance of the browser component, the third instance of the browser component initiated subsequent to the second instance of the browser component.

6. The computer-implemented method of claim 1, further comprising:
    confirming that the second instance of the browsing component is operating in connection with a browsing session authenticated to the user account before propagating the updated state information.

7. The computer-implemented method of claim 1, wherein storing state information for the browser component includes storing setting information related to the browser component, receiving updated state information from the first instance of the browser component includes receiving updated setting information related to the first instance of the browser component, and propagating the updated state information to the second instance of the browser component includes propagating the updated setting information to the second instance of the browser component.

8. The computer-implemented method of claim 1, wherein the first instance of the browser component is operating in connection with a first instance of the web browser, and wherein the second instance of the browser component is operating in connection with a second instance of the web browser.

9. The computer-implemented method of claim 1, wherein the browser component operating in connection with the user account includes a browsing session being authenticated to the user account, and wherein the first instance of the browser component is operating in connection with the browsing session.

10. The computer-implemented method of claim 1, wherein the first instance of the browser component and the second instance of the browser component are operating at the same time.

11. The computer-implemented method of claim 1, further comprising:
monitoring a bandwidth related to the propagating of the updated state information; and
throttling down bandwidth availability on a determination that a number of changes made to the state information over a predetermined period exceeds a predetermined threshold.

12. The computer-implemented method of claim 1, wherein the updated state information includes configuration information related to the first instance.

13. A system, comprising:
a processor; and
a memory, including server instructions that, when executed, cause the processor to:
store state information for a browser component in a storage remote from a client device, the storage associated with a user account;
receive updated state information from a first instance of the browser component operating on a first device and in connection with the user account; and
send a signal to a second instance of the browser component related to the updating of the stored state information;
receive a request from the second instance for the updated state information; and
send the updated state information to a second instance of the browser component operating on a second device, the first instance and the second instance operating during one or more overlapping periods, the updated state information being propagated subsequent to an initiation of the first instance, and at periodic time intervals during the one or more overlapping periods.

14. The system of claim 13, wherein the server instructions, when executed, further cause the processor to:
receive new state information from the first instance after the initiation of the second instance; and
send the new state information to the second instance.

15. The system of claim 13, wherein the server instructions, when executed, further cause the processor to:
monitor a bandwidth related to the sending of the updated state information; and
throttle down bandwidth availability on a determination that a number of changes related to the state information made over a predetermined period exceeds a predetermined threshold.

16. The system of claim 13, wherein the server instructions, when executed, further cause the processor to:
confirm that the second instance of the browsing component is operating in connection with a browsing session authenticated to the user account before the updated state information is sent.

17. The system of claim 13, wherein the state information includes configuration information related to the first instance of the browser component.

18. The system of claim 13, wherein the request from the second instance is received periodically.

19. A non-transitory machine-readable media including instructions that, when executed, perform a method for synchronizing information related to a browser component across multiple computing environments, the method comprising:
storing state information for a browser component in a remote storage associated with a user account;
receiving updated state information from a first instance of the browser component operating in connection with a web browser and the user account;
confirming that a subsequent instance of the browsing component is operating in connection with a browsing session authenticated to the user account, the first instance and the subsequent instance operating during one or more overlapping periods;
notifying the subsequent instance that the stored state information was updated;
receiving a request from the subsequent instance for the updated state information; and
propagating, from the remote storage, the updated state information to the subsequent instance of the browser component, at periodic time intervals during the one or more overlapping periods.

20. The machine-readable media of claim 19, the method further comprising:
receiving new state information from the first instance after the initiation of the subsequent instance; and
propagating the new state information to the subsequent instance.

21. The non-transitory machine-readable media of claim 19, wherein the request from the subsequent instance is received periodically.

22. The non-transitory machine-readable media of claim 19, wherein the updated state information includes configuration information related to the first instance.

* * * * *